United States Patent [19]

Harvey

[11] Patent Number: 5,734,507
[45] Date of Patent: Mar. 31, 1998

[54] OPTICAL BEAM SPLITTER AND ELECTRONIC HIGH SPEED CAMERA INCORPORATING SUCH A BEAM SPLITTER

[75] Inventor: Richard Paul Harvey, Buckinghamshire, United Kingdom

[73] Assignee: Hadland Photonics Limited, Hertfordshire, United Kingdom

[21] Appl. No.: 649,638

[22] PCT Filed: Nov. 29, 1994

[86] PCT No.: PCT/GB94/02600

§ 371 Date: Sep. 19, 1996

§ 102(e) Date: Sep. 19, 1996

[87] PCT Pub. No.: WO95/14951

PCT Pub. Date: Jun. 1, 1995

[30] Foreign Application Priority Data

Nov. 29, 1993 [GB] United Kingdom ............ 9324459

[51] Int. Cl.⁶ ............................. G02B 27/12; H04N 5/225
[52] U.S. Cl. .................. 359/639; 359/629; 359/633; 359/637; 358/909.1; 396/111; 396/452; 396/707; 396/730; 396/913; 396/866
[58] Field of Search .................. 358/909.1; 396/452, 396/706, 707, 730, 866, 913, 111; 359/618, 629, 633, 637, 639–811

[56] References Cited

U.S. PATENT DOCUMENTS 3,601,480  8/1971  Randall .............................. 352/84
4,167,756  9/1979  Smith ............................... 358/225

FOREIGN PATENT DOCUMENTS

| 0 140 529 | 5/1985 | European Pat. Off. |
| 0 484 801 | 5/1992 | European Pat. Off. |
| 0 484 802 | 5/1992 | European Pat. Off. |
| 40 41564 | 6/1992 | Germany |
| 42 12271 | 7/1993 | Germany |
| 357660 | 5/1931 | United Kingdom |
| 421100 | 12/1934 | United Kingdom |
| 1147965 | 4/1969 | United Kingdom |
| WO 93/21560 | 10/1993 | WIPO |

*Primary Examiner*—David C. Nelms
*Assistant Examiner*—Evelyn A. Lester
*Attorney, Agent, or Firm*—Westman, Champlin & Kelly, P.A.

[57] ABSTRACT

An optical beam splitter has an imaging lens assembly with a single optical axis and reflectors located on the image side of the lens to produce a number of real images of an object imaged by the lens. The imaging lens assembly is designed to image the real image formed by a camera lens assembly on the optical axis where the camera lens assembly has an exit pupil a known distance on the object side of this real image. The imaging lens assembly is then adapted to image this exit pupil of the camera lens to an aperture plane adjacent the reflectors. The optical beam splitter is described in particular in an application in an electronic high speed camera wherein multiple images of an object are formed for high speed photography.

4 Claims, 4 Drawing Sheets

© 1
OPTICAL BEAM SPLITTER AND ELECTRONIC HIGH SPEED CAMERA INCORPORATING SUCH A BEAM SPLITTER

BACKGROUND OF THE INVENTION

The present invention is concerned with an optical beam splitter and particularly with an electronic high speed camera incorporating a beam splitter.

Reference may be made to DE-C-4212271, which discloses an electronic high speed camera incorporating a pyramid mirror as a beam splitter. Light from an object is imaged by means of a camera objective, via the facets of a pyramid mirror on to a number of electronic image sensors arranged around the pyramid mirror. The camera objective is common to all the image sensors. In order to perform high speed photography of a short duration event, the image sensors can be exposed one after the other by means of fast acting electronic shutters.

The arrangement disclosed in the above patent has a number of inherent disadvantages. It is difficult to ensure that each of the several images formed by means of the beam splitter is evenly illuminated over the extent of the image. Further, there is nothing in the above German specification showing how to adjust the focusing or the aperture of the camera objective, and how such adjustability of the camera objective would effect the illumination of the various images produced by the pyramid mirror.

SUMMARY OF THE INVENTION

The present invention provides a substantial improvement over the system shown in the German specification. More generally, the present invention provides an improved optical beam splitter arrangement which may have other applications as well as in the form of electronic high speed camera disclosed in the above German specification.

In accordance with the present invention, an optical beam splitter comprises an imaging lens assembly having a single optical axis, and reflecting means located on the image side of said imaging lens assembly and having a plurality of angled reflecting surfaces disposed at different locations transversely of the optical axis to produce a respective corresponding real image of an object being imaged by said imaging lens assembly reflected in each of said reflecting surfaces, wherein said imaging lens assembly is arranged to image a real image formed of the object by a selected camera lens assembly locatable on said optical axis and having an exit pupil located at a known distance on the object side of said real image, said imaging lens assembly being adapted to image said exit pupil of the camera lens assembly to an aperture plane located adjacent said reflecting means.

This arrangement enables the optical beam splitter as defined to be used in combination with a standard selected camera lens. In a camera lens assembly, the exit pupil of the assembly may be taken to be spaced on the object side of the image plane of the assembly approximately by the effective focal length of the assembly. The beam splitter of the present invention is arranged to operate in combination with such a standard camera lens assembly, providing multiple images reflected in the respective reflecting surfaces of the real image formed by the camera lens assembly. At the same time, the imaging lens assembly of the optical beam splitter images the exit pupil of the camera lens assembly to a plane adjacent the reflecting surfaces. As a result, the beam splitting performed by the reflecting surfaces takes place in an exit pupil of the complete lens system comprising both the imaging lens assembly and the camera lens assembly. In this way, uneven illumination and shading of the images reflected in the reflecting surfaces can be avoided. Further, the usual focusing function of the camera lens assembly can still be exploited without effecting the optical performance of the rest of the beam splitter. Aperture adjustments can be performed either at an aperture plane within the selected camera lens assembly, or at the aperture plane provided adjacent the reflecting means. As will become apparent, using an iris at the aperture plane adjacent the reflecting means gives substantial advantages in minimising shading of the reflected images.

Conveniently, said reflecting means comprises a pyramid mirror located with its axis on said optical axis. Then, said pyramid mirror may have its apex located substantially in said aperture plane.

In a preferred arrangement, the optical beam splitter includes an adjustable iris in said aperture plane.

The invention also provides an electronic high speed camera comprising a camera housing containing a plurality of electronic image sensors and a respective electronic shutter device associated with each said sensor, and an optical beam splitter as defined above having a respective said reflecting surface to project a respective said real image for each of said image sensors, said camera housing including means to mount a camera lens assembly on said optical axis as said selected camera lens assembly.

As will be explained in more detail later herein, such a high speed camera can be used with standard camera lens assemblies. Generally, the imaging lens assembly of the beam splitter is optimised for a camera lens assembly of a predetermined focal length. However as will be shown, the design of the optical beam splitter is such that good performance can be achieved with a range of camera lens assemblies of different focal lengths.

DETAILED DESCRIPTION OF THE PREFERRED EMBODIMENTS

Figure 1:
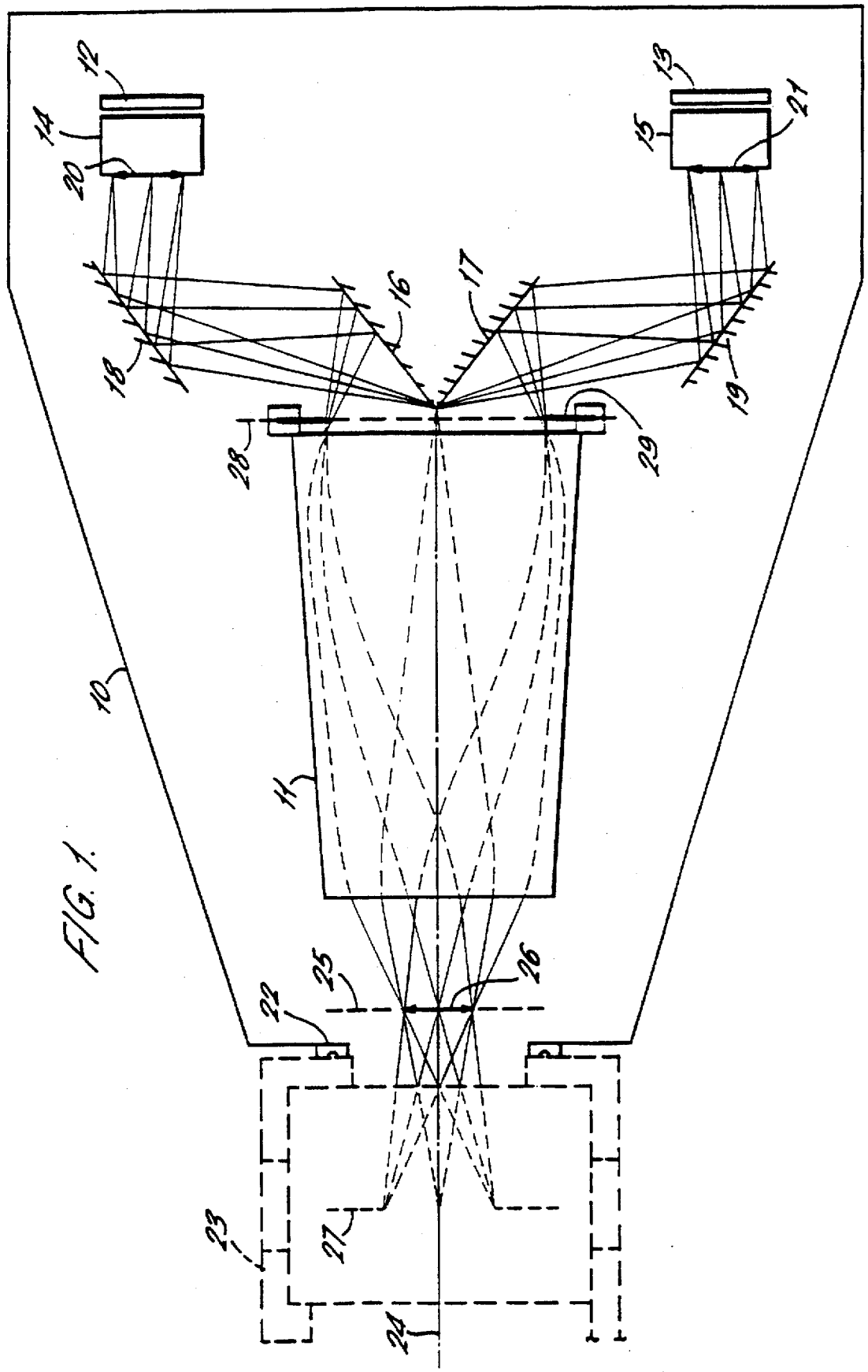
FIG. 1 is a schematic illustration of an electronic high speed camera incorporating an optical beam splitter and embodying the present invention.

Referring to FIG. 1, the illustrated electronic high speed camera comprises a camera housing 10 in which is mounted an imaging lens assembly shown schematically at 11, a pair of electronic image sensor devices 12 and 13, electronic shutters 14 and 15 for the two image sensor devices 12 and 13 and beam splitting mirrors 16 and 17 arranged in association with further plane mirrors 18 and 19 to project respective images 20 and 21 on to the shutters 14 and 15.

The housing 10 also has a fitting 22 at a front end of the housing to enable a camera lens assembly, shown in ghost at 23, to be mounted on the front of the housing.

In operation of the high speed camera, light from an object or event at some distance to the left in FIG. 1 along the optical axis 24 is focused by means of the camera lens assembly 23 and the imaging lens assembly 11 to form substantially corresponding images 20, 21 of the object or event on each of the shutters 14 and 15 in front of the image sensors 12 and 13. Then, control electronics, not shown in FIG. 1, is arranged to operate the shutters 14 and 15 as required in order to obtain successive recorded images of the object or event. By providing two or more image sensors and associated shutters, the time delay between successive recorded images can be reduced. The image sensors 12 and 13 may typically be solid state CCD sensors such as are used in electronic video cameras and the like. It takes typically about 30 milliseconds to clock out an image stored on a CCD sensor so that, in conjunction with an exposure time of up to 10 milliseconds prior to clocking out the image, the maximum frame rate of a typical CCD image sensor is about 25 Hz. By providing two (or more) sensors as shown in FIG. 1, successive images of the same object may be recorded with a very much shorter delay between them.

The optical configuration of the example illustrated in FIG. 1 will now be described in more detail. The camera lens assembly 23 illustrated in ghost outline may be a standard camera lens having a predetermined effective focal length and maximum aperture. As will become apparent, the imaging lens assembly 11 within the camera housing 10 is optimized for operation with a camera lens assembly 23 having one particular effective focal length. For example, the imaging lens assembly 11 may be optimized for a camera lens assembly having a focal length of 300 mm.

Typical camera lens assemblies which can be interchangeably mounted on an ordinary camera body are designed to focus an image on to an image plane 25 at a predetermined distance on the image side (to the right) of the attachment fitting for the lens to be mounted on a camera body. The light rays are shown in FIG. 1 emerging from the camera lens assembly 23 and forming a real image 26. The light rays illustrated are drawn as cones of rays emanating from the exit pupil 27 of the camera lens assembly 23. It is a reasonable assumption that the exit pupil 27 of the camera lens assembly 23 will in most instances be at a distance from the image plane 25 approximately equal to the effective focal length of the lens. In practice, with a compact multi element camera lens assembly, the exit pupil 27 may be substantially to the left (on the object side) of the lens assembly.

The imaging lens assembly 11 within the camera body 10 is designed to meet two criteria. On the one hand, the imaging lens assembly 11 must transfer the real image 26 formed by the camera lens assembly 23 to the front faces of the electronic shutters 14 and 15. It may be understood here that the shutters 14 and 15 can take the form of channel plate image intensifier devices so that an image formed on the front face of each shutter 14 or 15 as shown in the drawing is transferred (and amplified), when the intensifier is pulsed (i.e. the shutter is opened) to a phosphor screen immediately in front of the image sensor 12 or 13.

In addition to focusing an image of the object on to the shutters 14 and 15, the imaging lens assembly 11 is designed to transfer an image of the exit pupil 27 of the camera lens assembly 23 to the right hand side of the imaging lens assembly 11 immediately adjacent the mirrors 16 and 17. As a result, the exit pupil for the imaging lens assembly 11 in combination with the camera lens assembly 23 is an aperture plane 28 immediately to the right of the imaging lens assembly 11. This is true for the particular focal length of camera lens assembly 23 for which the imaging lens assembly is optimized.

Ideally, the point of intersection 29 between the reflecting surfaces 16 and 17 is located in this aperture plane 28, whereupon light from the object being imaged can be split by the two mirrors 16 and 17 to form two images 20 and 21 with no substantial shading or intensity variation across the images (assuming mirrors 16 and 17 are large enough). This is because, in the plane of an exit pupil, i.e. the aperture plane 28, the cones of light from every point on an object being imaged just completely fill the exit pupil. Therefore, if the light from only a part of the exit pupil is deflected to form an image, that image is evenly illuminated. By comparison, if reflecting surfaces 16 and 17 are employed at a position substantially spaced from the exit pupil, the amount of light being reflected by each reflecting surface will be different for different points on the image. This produces an intensity variation across the image reflected by the surface, and in extreme cases will completely shade parts of the image.

In practice with the arrangement illustrated in FIG. 1, good performance can be obtained for camera lens assemblies of a range of different focal lengths. With the camera lens focal length for which the imaging lens assembly 11 has been particularly optimized, the full aperture value of the camera lens may be utilised since the exit pupil is transferred by the lens assembly 11 to contain the apex of the beam splitting reflecting surfaces 16 and 17. With camera lens assemblies of non ideal focal length, it is necessary to reduce the aperture at the aperture plane 28 to avoid some intensity variation in the reflected images. An adjustable iris 29 is provided at the aperture plane 28 for this purpose.

Figure 2:
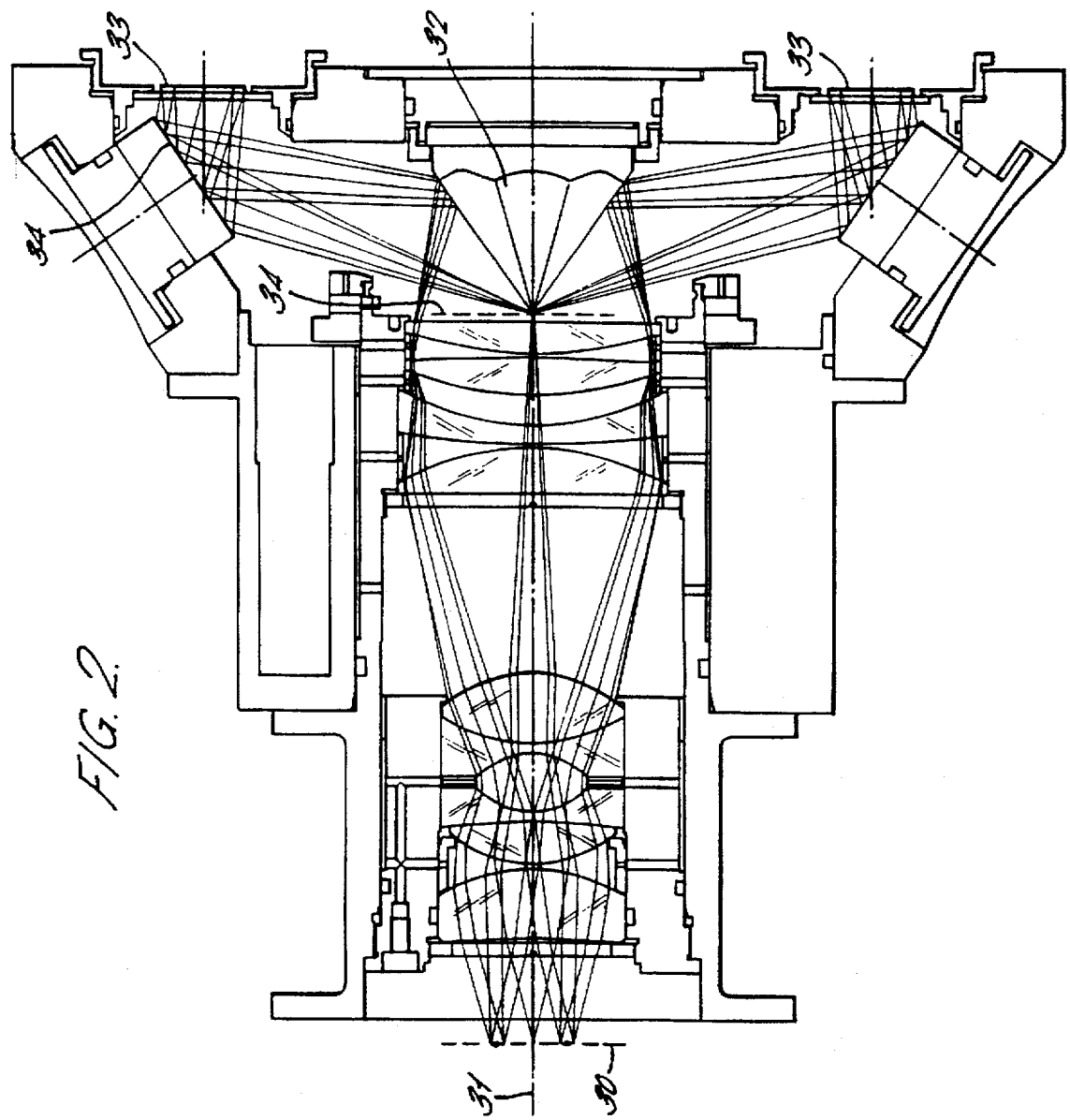
FIG. 2 is a detailed cross sectional view of a preferred embodiment of camera.
Figure 3:
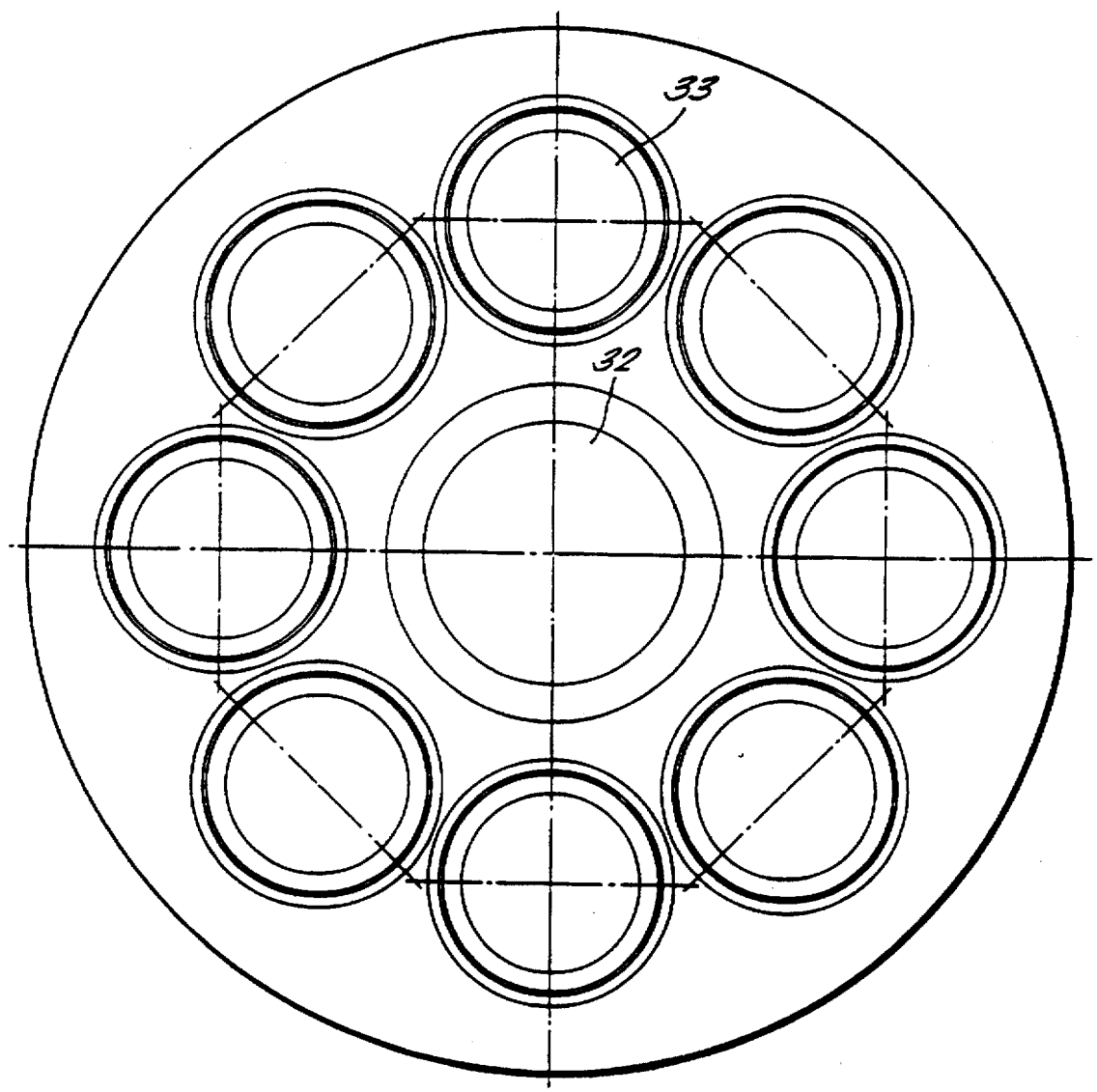
FIG. 3 is a sectional view of one end of the camera of FIG. 2 along the optical axis showing the distribution of image sensors.

Referring now to FIG. 2, a practical optical design is illustrated for the imaging lens assembly 11 together with the reflecting surfaces providing the beam splitting function. The real image of an object formed by the camera lens assembly (not shown in FIG. 2) is illustrated on the left of the Figure in the image plane 30. The imaging lens assembly comprises a total of nine lens elements located along the optical axis 31 between the image plane 30 and an aperture plane 34 immediately to the right of the right hand lens. A pyramid mirror is located on the optical axis with its apex in the aperture plane. The pyramid mirror has, in the present example, eight plane facets reflecting eight images of the object on to the faces 33 of eight image intensifier devices (not shown) for respective image sensor devices. In each case the respective image is reflected via an intermediate mirror 34. The distribution of the image intensifier and image sensor devices in relation to the pyramid mirror can be seen in FIG. 3 which is a view along the optical axis towards the apex of the pyramid mirror 32.

In FIG. 2 five cones of rays are shown emanating from the real image in the image plane 30. Each of these cones just fills the aperture plane 34 and the centre ray of each cone intercepts the apex of the pyramid mirror 32. The lens assembly illustrated in FIG. 2, is designed so that these cones of rays when projected to the left all symmetrically fill the exit pupil of the camera lens assembly for which the imaging lens assembly has been optimised. This is illustrated in FIG. 4 where the image plane 30 is shown at the right hand side and the cones of rays are shown symmetrically filling an exit pupil located 300 mm to the left of the image plane, implying that the imaging lens assembly is optimized for a camera lens assembly having an effective focal length of 300 mm.

Figure 4:
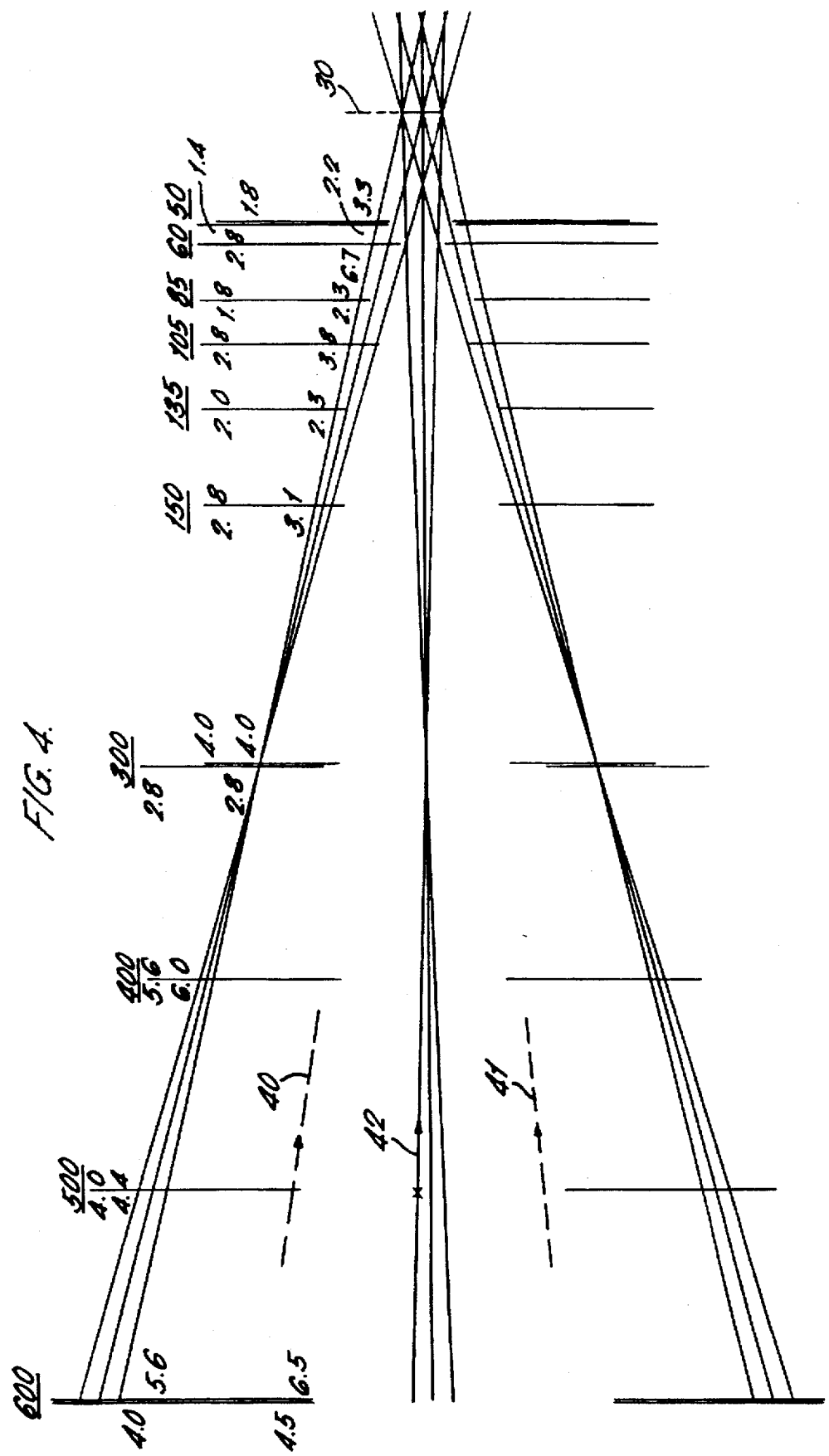
FIG. 4 is an optical ray diagram illustrating the optimization of the preferred embodiment of camera for a camera lens assembly of a particular focal length.

Referring further to FIG. 4, the ray diagram illustrated is also marked with the maximum apertures and effective focal lengths of a range of different camera lenses. Thus, considering lenses of focal length 300 mm, two aperture values are shown f/2.8 and f/4.0. As can be seen, the cones of rays from the maximum aperture available at the aperture plane 34 of the imaging lens assembly in the high speed camera body fully and symmetrically encompass the larger aperture at 300 mm focal length. It can be seen, therefore, that using a camera lens assembly of focal length 300 mm with f/2.8 can produce no intensity variation or shading of the plural images reflected by the pyramid mirror 52.

On the other hand, considering a longer focal length camera lens, say 500 mm, f/4.0, the different cones of rays do not symmetrically, fill the aperture of the camera lens. Considering the "chief ray" through the lower end of the image at the image plane 30, i.e. the ray passing through the centre of the exit pupil at 300 mm, in order for a cone of light from the camera lens aperture at 500 mm to illuminate the pyramid mirror 32 evenly on both sides of the apex of the mirror, the light cone should be restricted to that between the rays 40 and 41 symmetrically either side of the chief ray 42. Therefore, in the absence of any other steps, the full cone of light from the aperture at 500 mm will illuminate one side (in fact the upper side in FIG. 2) of the pyramid mirror more widely than the other. This would result in the intensity of the lower end of the image reflected in the pyramid mirror being greater for the image on the upper image sensor than that on the lower image sensor.

In order to remove this effect, the high speed camera illustrated in FIG. 2 includes an iris in the aperture plane 34 which is used to stop down the aperture of the camera to restrict the cone of rays that can illuminate the pyramid mirror to the size which can pass symmetrically through the aperture of the camera lens assembly being used. In the present case, the iris in the aperture plane 34 must be stopped down to confine the cones of rays which can pass through the aperture on to the pyramid mirror to the size illustrated by rays 40 and 41 in FIG. 4. Although this is a significant reduction of the maximum aperture capability of the imaging lens assembly of FIG. 2, it is only a slight restriction of the effective aperture available through the camera lens assembly. Calculations show that the effect of stopping down the aperture of the imaging lens assembly to ensure even illumination of the images is to reduce the effective aperture of the camera lens from f/4.0 to f/4.4.

Similar aperture reductions by means of the iris in the high speed camera can permit the camera to be used with a wide range of camera lens assemblies, with varying amounts of reduction of the effective aperture available from the camera lens. The aperture reductions in each case are illustrated in FIG. 4 with no reduction required for the camera lenses of 300 mm for which the imaging lens assembly has been optimised. The worst case aperture reduction for the range of camera lenses illustrated in FIG. 4 is in the case of a camera lens having focal length 60 mm and aperture f/2.8, which must effectively be reduced by means of the iris in the high speed camera to f/6.7.

The detailed design of the imaging lens assembly illustrated in FIG. 2 is within the ordinary ability of an optical engineer. The considerations to be applied in designing the optical system include minimizing chromatic and other aberrations.

What is claimed is:

1. An electronic high speed camera comprising a camera housing containing a plurality of electronic image sensors, a respective electronic shutter device associated with each said sensor, and an optical beam splitter comprising an imaging lens assembly having a single optical axis, and reflectors located on an image side of said imaging lens assembly and having a plurality of angled reflecting surfaces disposed at different locations transversely of the optical axis to produce a respective corresponding real image of an object being imaged by said imaging lens assembly reflected in each of said reflecting surfaces, a respective said reflecting surface projecting a respective said real image for each of said image sensors, and said camera housing including a mount for a selected camera lens assembly to be mounted on said optical axis, wherein said imaging lens assembly is arranged to image a real image formed of the object by said selected camera lens assembly when mounted on said mount, said selected camera lens assembly having an exit pupil located at a known distance on an object side of said real image, and said imaging lens assembly is adapted to image said exit pupil of the camera lens assembly to an aperture plane located adjacent said reflectors.

2. An optical beam splitter as claimed in claim 1, wherein said reflecting means comprises a pyramid mirror located with its axis on said optical axis.

3. An optical beam splitter as claimed in claim 2, wherein said pyramid mirror has an apex located substantially in said aperture plane.

4. An optical beam splitter as claimed in claim 1, and including an adjustable iris in said aperture plane.

* * * * *